Figure 3:
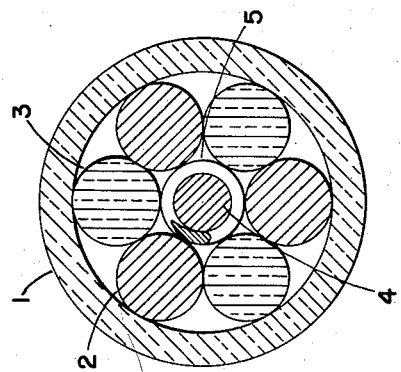

Jan. 20, 1959      C. L. SAUNDERS      2,869,217
METHOD FOR ASSEMBLING TRAVELLING WAVE TUBES

Filed Feb. 14, 1957

INVENTOR.
CLARENCE L. SAUNDERS
BY
              ATTORNEY

United States Patent Office 2,869,217
Patented Jan. 20, 1959

2,869,217

METHOD FOR ASSEMBLING TRAVELLING WAVE TUBES

Clarence L. Saunders, Astoria, N. Y., assignor to Sylvania Electric Products Inc., a corporation of Massachusetts Application February 14, 1957, Serial No. 640,218

6 Claims. (Cl. 29—25.14)

My invention is directed towards methods for assembling travelling wave tubes.

In one widely used method for producing travelling wave tubes, it is necessary, during tube assembly, to insert a helical conductor or helix within a hollow glass tube in such manner that the helix is rigidly supported without deformation within the tube and yet is insulately separated from the tube. This insertion is normally carried out by first winding the helix about a mandrel. A plurality of ceramic rods are then circumferentially disposed about the periphery of the helix and sealed thereto. The rod-helix structure is then removed from the mandrel and inserted into the tube. Finally this structure is then sealed to the tube.

This known method suffers from a number of serious disadvantages. For example, the step of sealing the rods to the helix must be carried out with great care and requires the use of expensive jigs and similar fixtures. Further, this sealing operation and the subsequent sealing of the rods to the tube inavoidably produce small spacing variations between the rods, helix and tube; these spacing variations, under operating conditions, cause variations in dielectric loading and reduce the efficiency and power handling of a traveling wave tube.

I have developed a new method for inserting a helix within a tube which overcomes these disadvantages.

Accordingly, it is an object of the present invention to improve travelling wave tube assembly methods for inserting a helix within a hollow tube.

Another object is to provide a new and improved tube assembly method of the character indicated.

Still another object is to improve methods for inserting a helix within a hollow tube by first attaching support rods to a helix, then inserting the helix and rods within a tube and peripherally shrinking the tube onto the rods.

These and other objects of my invention will either be explained or will become apparent hereinafter.

In accordance with the principles of my invention, a helix is wound about a mandrel in conventional manner. A plurality of separate spacer and support rods extending in a direction parallel to the axis of the mandrel are then circumferentially cemented about the helix, thus forming a rod-helix bundle about the mandrel. The bundle-carrying mandrel is then inserted into a suitable hollow member, as for example a glass tube. The tube is then peripherally shrunk upon the bundle to form an integral structure. Finally, the mandrel and spacer rods are removed from the tube, as for example by chemically dissolving the spacer rods and the mandrel, to form the final assembly, wherein the helix is rigidly supported within the tube.

Figure 2:
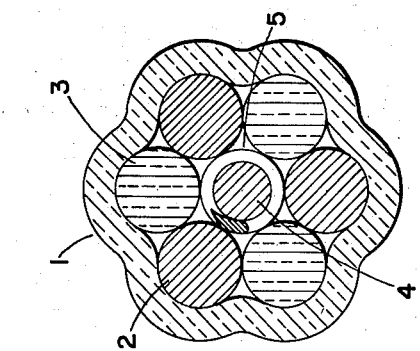
Figure 1:
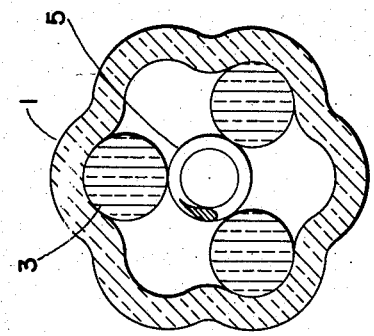

Illustrative embodiments of my invention will now be described in detail with reference to the accompanying drawing wherein Figs. 1, 2 and 3 are cross sectional views illustrating the cooperation of the hollow member and the bundle-carrying mandrel during various stages of my process.

Referring now to Fig. 1, a helix 5 is wound about a mandrel 4 in known manner. With the helix still secured to the mandrel, a plurality of alternately spaced dielectric support rods 3 and spacer rods 2 (all rods extending in the direction of the mandrel axis) are circumferentially disposed about the helix and are cemented thereto. The spacer rods and mandrel are normally both formed from the same material, as for example tungsten or molybdenum. The dielectric support rods are formed from a different material, as for example a ceramic.

The bundle-carrying mandrel is then inserted into glass tubing 1, the inner diameter of the tubing being only slightly larger than the outer diameter of the bundle.

The glass tubing is then heated until it softens. At this point, the pressure on the outside of the glass tubing is increased over that existing on the inside of the glass tubing so that the soft glass is forced against the rods by the differential pressure, thus peripherally shrinking the glass upon the support and spacer rods, as shown in Fig. 2.

I have found that this step can readily be carried out by heating the tube with a gas torch and at the same time exhausting air from the inside of the glass tube by means of a vacuum pump.

The spacer rods 3 and mandrel 4 are then removed from the assembly shown in Fig. 2, as for example by pumping a chemical solution, such as a dilute mixture of sulphuric acid and nitric acid, through the voids of the assembly which rapidly dissolves the spacer rods and mandrel and at the same time does not attack the glass tubing, helix, or the dielectric support rods. In the resulting structure, as shown in Fig. 3, the helix is held firmly in place by means of dielectric support rods which are in turn held in place by the shrunk glass tubing.

While I have shown and pointed out my invention as applied above, it will be apparent to those skilled in the art that many modifications can be made within the scope and sphere of my invention as defined in the claims which follow.

What is claimed is:

1. A method for mounting a helix structure into a hollow member which comprises the steps of winding said structure upon a mandrel; securing a plurality of separate support rods and spacer rods to said structure to form a bundle about said mandrel; inserting said bundle-carrying mandrel within said member; shrinking said member peripherally about said bundle; and removing said spacer rods and said mandrel from said member.

2. In a method for mounting a helix within a hollow member, the steps of inserting a bundle-carrying mandrel within said member, said bundle being formed from separate support rods and spacer rods and said helix; shrinking said member peripherally onto said bundle, and chemically removing said spacer rods and said mandrel from said member.

3. A method for mounting a helically shaped electrical conductor within a hollow tube which comprises the steps of inserting a bundle-carrying mandrel into said tube, said bundle being formed from said conductor and a plurality of alternately spaced spacer and support rods peripherally secured about said conductor and extending in the direction of the mandrel axis, said mandrel and said spacer rods being relatively susceptible to chemical dissolution, said support rods being relatively non-susceptible to chemical dissolution; shrinking said member peripherally about said bundle; and chemically dissolving said mandrel and said spacer rods.

4. A method for mounting a helical electrical conductor into a hollow glass tube which comprises the steps of inserting a bundle-carrying mandrel into said tube, said bundle being formed from said conductor and a plurality of alternately spaced spacer and support rods secured to the periphery of said conductor and extending in the direction of the mandrel axis; softening said glass; shrinking said softened glass peripherally upon said bundle; and chemically dissolving said mandrel and said spacer rods.

5. A method as set forth in claim 4, wherein said shrinking step is carried out by producing a differential pressure between the outside and inside walls of said tube, the pressure on the outside wall exceeding that of the inside wall.

6. A method for mounting a helix structure into a hollow member which comprises the steps of winding said structure upon a mandrel; securing a plurality of separate support rods and spacer rods to said structure to form a bundle about said mandrel; inserting said bundle-carrying manadrel within said member; softening said member; producing a differential pressure between the outer and inner walls of said softened member at which said member is shrunk peripherally onto said bundle; and removing said spacer rods and said mandrel from said member.

References Cited in the file of this patent

UNITED STATES PATENTS

| | | |
|---|---|---|
| 2,457,218 | Ferrell | Dec. 28, 1948 |
| 2,619,706 | Vause | Dec. 2, 1952 |
| 2,790,926 | Morton | Apr. 30, 1957 |